United States Patent [19]
Ylikangas

[11] Patent Number: 5,934,588
[45] Date of Patent: Aug. 10, 1999

[54] FISHING REEL WITH CENTRIFUGAL BRAKE

[75] Inventor: Roger Ylikangas, Karlshamn, Sweden

[73] Assignee: Berkley Inc., Spirit Lake, Iowa

[21] Appl. No.: 09/045,935

[22] Filed: Mar. 23, 1998

[51] Int. Cl.⁶ .............................................. A01K 89/0155
[52] U.S. Cl. ......................... 242/289; 188/185; 188/187
[58] Field of Search ............................ 242/289; 188/184, 188/185, 186, 187

[56] References Cited

U.S. PATENT DOCUMENTS

| | | | |
|---|---|---|---|
| 2,290,662 | 7/1942 | Willison | 242/289 |
| 2,482,863 | 9/1949 | Nelson | 242/289 |
| 2,967,676 | 1/1961 | Klingberg | 242/289 |
| 3,314,308 | 4/1967 | Ziegler | 188/186 |
| 3,477,659 | 11/1969 | Morritt | 242/289 |
| 4,390,140 | 6/1983 | Karlsson et al. . | |
| 5,542,619 | 8/1996 | Karlsson | 242/289 |

FOREIGN PATENT DOCUMENTS

| | | | |
|---|---|---|---|
| 145570 | 6/1954 | Sweden | 242/289 |

*Primary Examiner*—Katherine A. Matecki
*Attorney, Agent, or Firm*—Roylance, Abrams, Berdo & Goodman, L.L.P.

[57] ABSTRACT

A fishing reel of the multiplier type has a frame, a line spool rotatably mounted in the frame, a brake disk coaxial with the line spool and non-rotatably but axially displaceably arranged in the frame, and a brake unit connected to the line spool and adapted, in cooperation with the brake disk, to brake spool rotation. The brake unit has brake arms with a first end and a second end. The brake arms support at their first end a brake element and are at their second end connected to the holder in a manner pivotable about a pivot axis perpendicular to the line spool axis, so as to be pivoted between an off-position and a braking position, in which the brake elements engage the brake disk. The first end of each brake arm is positioned radially inside its second end. Each brake arm extends in a direction which is so offset from a radial direction in respect of the line spool axis that its first end is positioned in the direction of rotation of the line spool seen behind its second end.

6 Claims, 3 Drawing Sheets

FISHING REEL WITH CENTRIFUGAL BRAKE

FIELD OF THE INVENTION

The present invention relates to a fishing reel of the multiplier type.

BACKGROUND ART

Known fishing reels of this type have a frame and a line spool rotatably mounted in the frame. To prevent the spool, during casting, from rotating at such a high speed that the line cannot be paid out at the same rate but instead rises, forming a so-called birdnest, these prior-art fishing reels are equipped with a mechanical brake, usually a friction brake. The braking power of the friction brake can be adjusted by means of a turnable knob. To the same end, use is generally made of an additional friction brake in the form of a centrifugal brake.

A prior-art centrifugal brake consists of a ring non-rotatably connected to the line spool and having two diametrically opposed pins projecting radially outwards and each supporting a centrifugal weight which is slidable along the respective pin. During the rotation of the line spool, the centrifugal weights are urged radially outwards so as to engage the inner circumferential surface of a brake ring connected to the frame. During a cast, the rotational speed of the line spool increases rapidly to maximum speed during a relatively short, initial phase of acceleration to thereafter decrease during a longer phase of deceleration. The centrifugal brake is immediately actuated during a cast and thus produces a braking action commencing during the phase of acceleration. During this phase, there is however only a negligible risk of line rise, since it is the line, or more precisely the lure attached to it, that "pulls" the line spool, for which reason the line spool need not be subjected to braking during this phase. Braking the line spool during the phase of acceleration reduces the possibilities of making long casts. When the lure and the line are no longer "pulling" the line spool, i.e. during the phase of deceleration, it is however necessary to brake the line spool to prevent line rise. A further drawback of this prior-art centrifugal brake is that it is difficult to adapt the braking effect of the brake to the weight of the lure since such adaptation can take place only by changing centrifugal weights, which makes it necessary to disassemble the fishing reel.

SUMMARY OF THE INVENTION

An object of the present invention therefore is to provide a fishing reel overcoming these drawbacks. Another object of the present invention is to provide a fishing reel having a centrifugal brake which does not brake the line spool during the initial phase of acceleration but during the following phase of deceleration. A further object of the present invention is to provide a fishing reel having a centrifugal brake which does not brake the line spool during the initial phase of acceleration but during the following phase of deceleration and which allows easy control of the braking effect, especially for adaptation to the weight of the lure.

The foregoing objects are basically attained by providing a fishing reel of the multiplier type comprising
 a frame,
 a line spool rotatably mounted in the frame,
 a brake disk coaxial with the line spool and non-rotatably connected to the frame
 an adjusting means for axial displacement of the brake disk and adjustment of the axial position thereof in relation to the line spool, and
 a friction brake means connected to the line spool and adapted, in cooperation with the brake disk, to brake spool rotation,
 the brake means comprising a holder which is rotatable together with the line spool and supports at least one brake arm which at its one end supports a brake element and which, at its other end, is connected to the holder in a manner pivotable about a pivot axis essentially perpendicular to the line spool axis, so as to be pivoted between a braking position, in which the brake element of the brake arm engages the brake disk, and an off-position, in which the brake element is disengaged from the brake disk,
 the one end of the brake arm being positioned radially inside its other end, and
 the brake arm extending in a direction which is so offset from a radial direction in respect of the line spool axis that its one end is positioned in the direction of rotation of the line spool seen behind its other end.

According to the invention, the foregoing objects are also basically achieved by a fishing reel of the multiplier type comprising
 a frame,
 a line spool rotatably mounted in the frame,
 a brake disk coaxial with the line spool and non-rotatably connected to the frame,
 an adjusting means for axial displacement of the brake disk and adjustment of the axial position thereof in relation to the line spool, and
 a friction brake means connected to the line spool and adapted, in cooperation with the brake disk, to brake spool rotation,
 said brake means comprising a holder which is rotatable together with the line spool and supports at least two brake arms which are uniformly distributed in the circumferential direction of the line spool and which each at their one end support a brake element and which each, at their other end, are connected to the holder in a manner pivotable about a pivot axis essentially perpendicular to the line spool axis, so as to be pivoted between a braking position, in which the brake element of the brake arm engages the brake disk, and an off-position, in which the brake element is disengaged from the brake disk,
 said one end of each brake arm being positioned radially inside its said other end, and
 each brake arm extending in a direction which is so offset from a radial direction in respect of the line spool axis that its said one end is positioned in the direction of rotation of the line spool seen behind its said other end.

In a preferred embodiment, each brake arm has at its said one end a pivot pin which is parallel to the pivot axis and on which a brake block constituting the brake element of the brake arm is rotatably mounted.

BRIEF DESCRIPTION OF THE DRAWINGS

The invention will now be described in more detail with reference to the accompanying drawings.

DESCRIPTION OF A PREFERRED EMBODIMENT OF THE INVENTION

Figure 1:
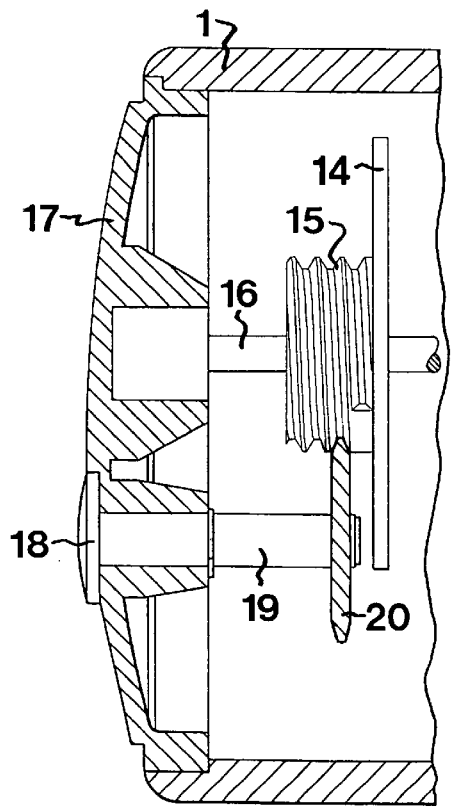
FIG. 1 is a longitudinal section of a portion of a fishing reel according to the invention.

The fishing reel according to the invention, which is of the multiplier type, is, except for the new centrifugal brake, of a conventional kind and will therefore not be described in more detail. Only a relevant portion of the fishing reel is shown in FIG. 1.

The inventive fishing reel has a frame 1, a spool 2 mounted in the frame 1 for receiving a fishing line (not shown) and a handle (not shown) with an associated transmission mechanism (not shown) for rotating the line spool 2 in the retrieval direction, i.e. in the direction in which the fishing line is wound onto the line spool. The line spool 2 has an end sleeve 3 which is coaxial therewith and non-rotatably connected thereto.

The new centrifugal brake includes a brake means, which is fixed to one end of the line spool 2. This brake means has a holder 4 in the form of an essentially circular disk with two diametrically extending projections 5. The holder 4 has a center hole 6, in which the end sleeve 3 of the line spool 2 is inserted with press fit. The holder 4 thus is non-rotatably connected to the end sleeve 3 of the line spool 2 and, consequently, non-rotatably connected to the line spool.

The holder 4 may have more than two projections 5, which are uniformly distributed in the circumferential direction of the line spool 2, i.e. are arranged at the same mutual angular distance, for imbalance not to occur in the holder 4.

The holder 4 is made of plastic material and its projections 5 each support a brake arm 7. Each projection 5 has a lug 8, which protrudes axially away from the line spool 2 and which is integrated with the holder 4 and has a through hole, the hole axis of which is parallel to the plane of the holder 4. Each brake arm 7 is made of plastic material and has at each end a pivot pin 9, 10 which is integrated with the brake arm. The two pivot pins 9, 10 of each brake arm 7 are parallel with each other and project laterally from one side of the brake arm. Each pivot pin 9, 10 is circular in cross-section and at its free end provided with a head, the diameter of which is slightly greater than the diameter of the pivot pin. Each pivot pin 9, 10 also has an axial slot 11, 12, which permits elastic compression of the pivot pin. Each brake arm 7 supports a brake block 13 of plastic material or some other suitable material which gives suitable friction when engaging a brake disk 14, which will be described in more detail below and which is also included in the centrifugal brake. The blocks 13 have a through hole and are rotatably mounted on the pivot pin 9 at one end of the respective brake arms 7 and are retained on the pivot pin by the head thereof.

Figure 3:
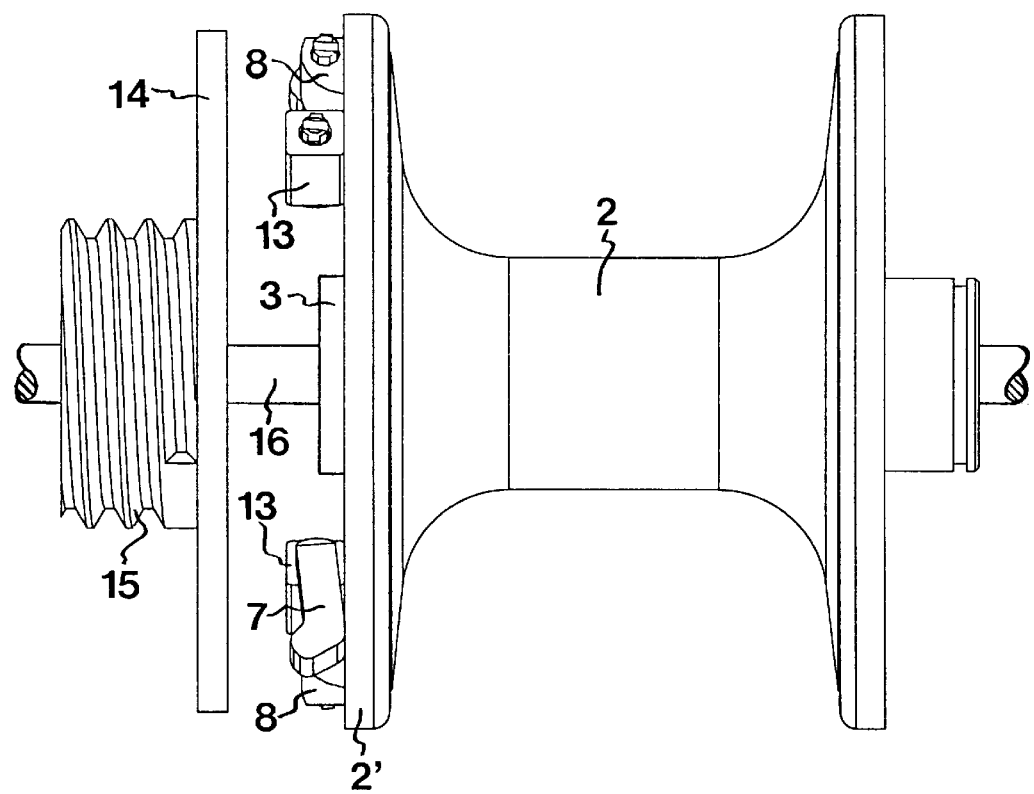
FIG. 3 is a side view showing the line spool and brake means of the fishing reel, the brake means being shown in an off-position.

The pivot pin 10 at the other end of the two brake arms 7 extends through the hole in the respective lug 8 and is retained thereon by the pin head. Consequently, the brake arms 7 are pivotally connected to the holder 4. The brake arms 7 are pivotable between an off-position, which is shown in FIG. 3 and in which they extend essentially in parallel with the holder 4, and a braking position, which is shown in FIGS. 4 and 5 and in which the brake blocks 13 engage the brake disk 14 to effect braking of the line spool 2.

As is evident from the drawings, said one end of each brake arm 7, i.e. its free, block-supporting end, is positioned radially inside its said other end, i.e. its end pivotally mounted on the holder 4. As is also evident (see FIG. 2), each brake arm 7 extends in a direction which is so offset from the radial direction in respect of the axis of the line spool 2 that its said one end is positioned in the direction of rotation R of the line spool 2 seen behind its said other end. By the direction of rotation R of the line spool 2 is here and in the appended claims meant the direction in which the line spool 2 rotates during casting, i.e. the direction opposite to the direction of line retrieve.

Figure 4:
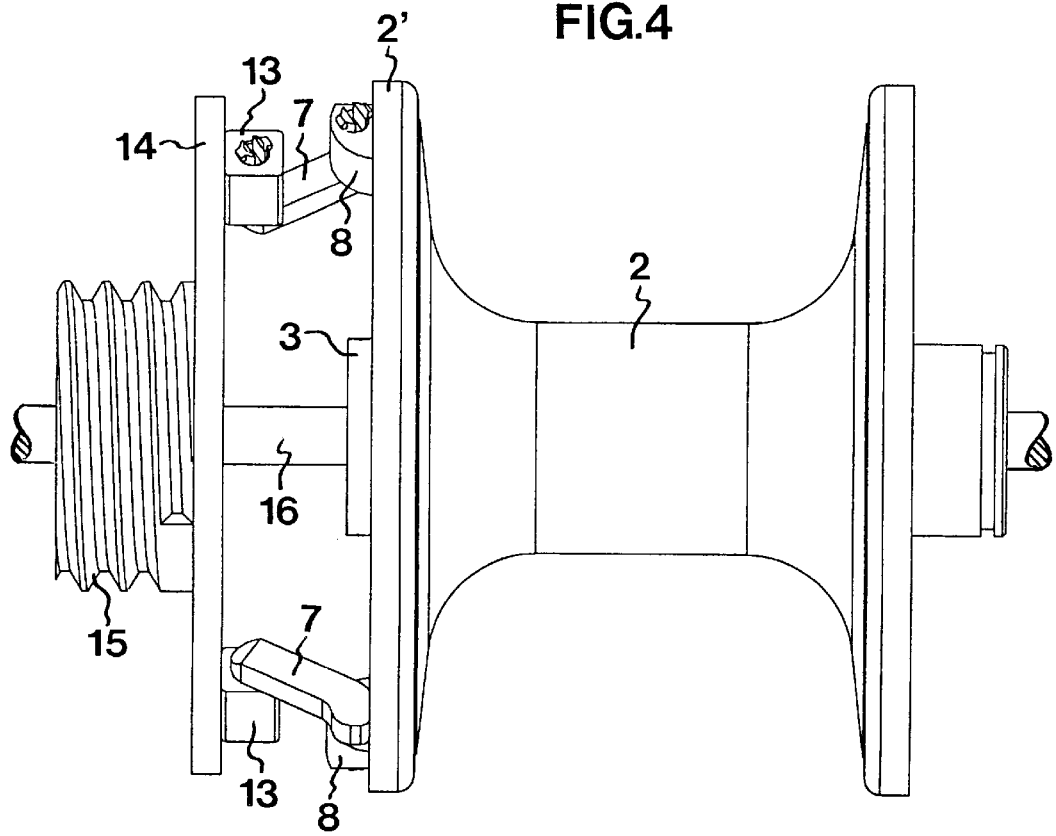
FIG. 4 corresponds to FIG. 3 but shows the brake means in a braking position.
Figure 5:
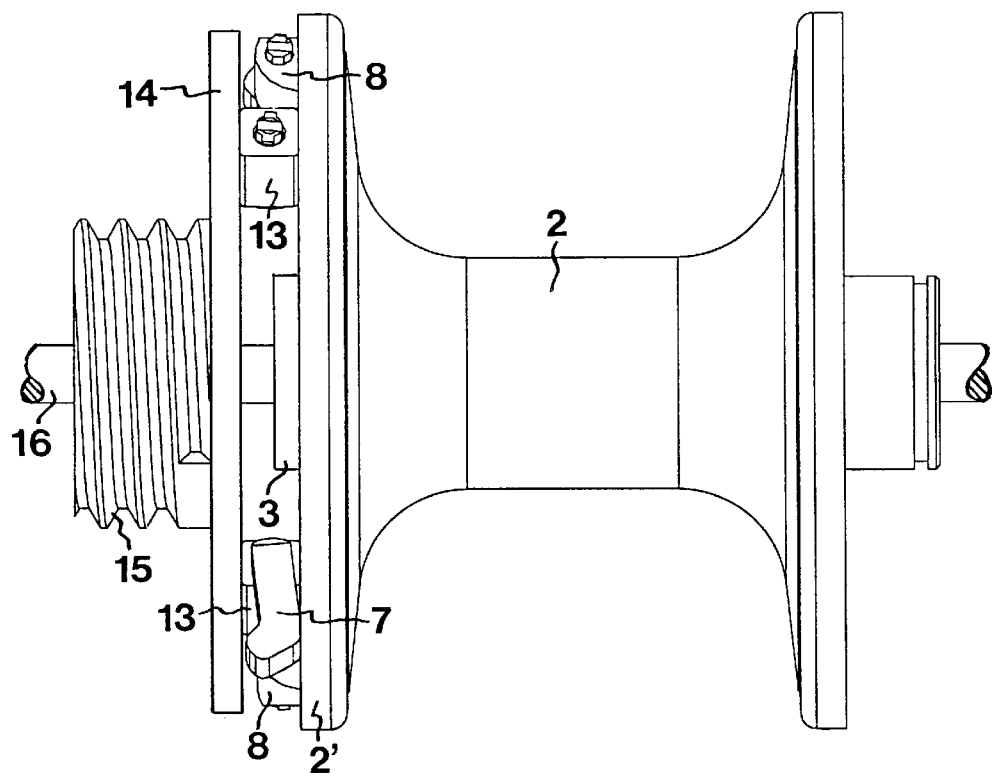
FIG. 5 corresponds to FIG. 4 and shows the brake means in the braking position, a brake disk cooperating with the brake means, however, being shown in a position different from that in FIGS. 3 and 4.

By the brake means being designed in the manner described above, the brake arms 7 are, during the acceleration of the line spool 2, e.g. during the initial phase of acceleration of a cast, held in their off-position (FIG. 3) and during the deceleration of the line spool 2, e.g. during the phase of deceleration comprising the major part of the time of line pay-out, held in their braking position (FIGS. 4 and 5). When the line spool 2 rotates at constant speed, the brake arms 7 are retained in their braking position.

The new centrifugal brake includes, as mentioned above, also the brake disk 14. The brake disk 14 is integrated with a sleeve 15 and is, together with this, movable back and forth along a spindle 16. The spindle 16 is fixedly connected to a cover 17 releasably attached to the frame 1 and extends in parallel with the axis of the line spool 2.

An adjusting knob 18 with a spindle 19 is turnably fixed in the cover 17. The spindle 19 is parallel with the fixed spindle 16 and supports at its inner end a gear wheel 20 with inclined teeth which engage the sleeve 15. As the adjusting knob 18 is turned, also the spindle 19 and the gear wheel 20 are turned, the sleeve 15 and, thus, the brake disk 14 being moved along the spindle 16 owing to the friction of the gear wheel 20 and the sleeve 15. Preferably sleeve 15 has external teeth and the friction between sleeve 15 and wheel 20 is produced by the meshing of the teeth of sleeve 15 and wheel 20. The direction of displacement depends on the direction of turning of the adjusting knob 18.

By turning the adjusting knob 18, it is thus possible to move the brake disk 14 in the axial direction, thereby adjusting its axial position in relation to the line spool 2 and, thus, in relation to the brake means mounted thereon. By the fact that in different displacement positions of the brake disk 14, the brake blocks 13, as is evident when comparing FIGS. 4 and 5, engage the brake disk 14 at different radial distances from the center thereof, and, thus, with different pivoting positions of the brake arms 7, a braking effect is obtained, which is dependent on the setting position of the brake disk 14. In the setting position of the brake disk 14 as shown in FIG. 4, in which the brake disk is located at a relatively great distance from the line spool 2, a greater braking effect is achieved than in the setting position shown in FIG. 5, in which the brake disk is located at a relatively small distance from the line spool 2. This depends on the fact that the brake blocks 13 in FIG. 4 are located at a greater radial distance from the center of the brake disk 14 than in FIG. 5, but especially on the fact that the brake arms 7 in FIG. 4 make a greater angle with the brake disk 14 and thus occupy a smaller amount of the centrifugal force acting on the brake blocks 13 than in FIG. 5. In FIG. 4, the brake arms 7 thus occupy a smaller amount and the brake disk 14 hence a greater amount of the centrifugal force than in FIG. 5. The setting position of the brake disk 14 as shown in FIG. 4 is thus adapted to a heavier lure than the setting position shown in FIG. 5.

Figure 2:
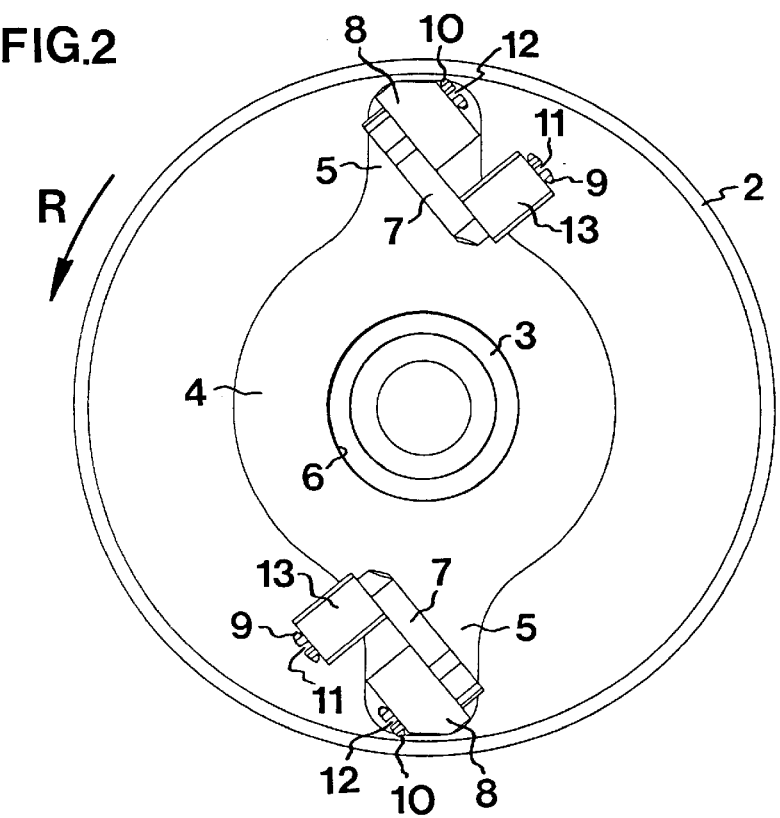
FIG. 2 is an end view showing the line spool of the fishing reel and a brake means arranged at one end of the line spool.
Figure 6:
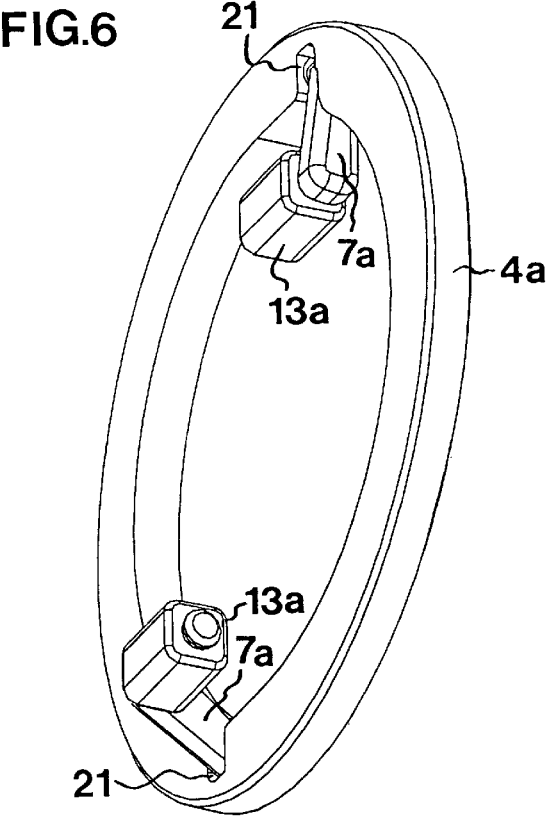
FIG. 6 is a perspective view showing the brake means in an alternative embodiment.

FIG. 6 shows the brake means in an alternative embodiment. This brake means has a holder 4a which like the holder 4 in FIG. 2 is non-rotatably connected to the line spool 2. The holder 4a, which is in the form of a circular ring, is inserted with press fit in a circumferential flange 2' (see FIGS. 3–5) at one end of the line spool 2. The brake arms 7a of the holder 4a are pivotally attached in diametrically opposite notches 21 in the holder 4a. The brake arms 7a each support a brake block 13a. Otherwise the brake arms 7a are arranged in the same manner as the brake arms 7 in the holder 4 described above.

What I claim and desire to secure by Letters Patent is:

1. A fishing reel of the multiplier type comprising a frame, a line spool rotatably mounted in the frame, a brake disk coaxial with the line spool and non-rotatably connected to the frame, a friction brake means connected to the line spool and adapted, in cooperation with the brake disk, to brake spool rotation, said brake means comprising a holder which is rotatable together with the line spool and supports at least one brake arm which at its one end supports a brake element and which at its other end, is connected to the holder in a manner pivotable about a pivot axis essentially perpendicular to the line spool axis, so as to be pivoted between a braking position, in which the brake element of the brake arm engages the brake disk, and an off-position, in which the brake element is disengaged from the brake disk, said one end of the brake arm being positioned radially inside its said other end, and the brake arm extending in a direction which is so offset from a radial axis of the line spool that its said one end is positioned in the direction of rotation of the line spool seen behind its said other end.

2. A fishing reel as claimed in claim 1, wherein said at least one brake arm at its said one end has a pivot pin which is parallel to the pivot axis and on which a brake block constituting the brake element of said at least one brake arm is rotatably mounted.

3. A fishing reel according to claim 1, wherein, said at least one brake arm includes at least two brake arms which are uniformly distributed in the circumferential direction of the line spool.

4. A fishing reel of the multiplier type comprising a frame, a line spool rotatably mounted in the frame, a brake disk coaxial with the line spool and non-rotatably connected to the frame, an adjusting means for axial displacement of the brake disk and adjustment of the axial position thereof in relation to the line spool; and a friction brake means connected to the line spool and adapted, in cooperation with the brake disk, to brake spool rotation, said brake means comprising a holder which is rotatable together with the line spool and supports at least one brake arm which at its one end supports a brake element and which at its other end, is connected to the holder in a manner pivotable about a pivot axis essentially perpendicular to the line spool axis, so as to be pivoted between a braking position, in which the brake element of the brake arm engages the brake disk, and an off-position, in which the brake element is disengaged from the brake disk, said one end of the brake arm being positioned radially inside its said other end, and the brake arm extending in a direction which is so offset from a radial axis of the line spool that its said one end is positioned in the direction of rotation of the line spool seen behind its said other end.

5. A fishing reel according to claim 4, wherein, said at least one brake arm includes at least two brake arms which are uniformly distributed in the circumferential direction of the line spool.

6. A fishing reel as claimed in claim 5, wherein each brake arm at its said one end has a pivot pin which is parallel to the pivot axis and on which a brake block constituting the brake element of the brake arm is rotatably mounted.

* * * * *